United States Patent

[11] 3,581,560

| [72] | Inventor | Jean Odier |
| | | Antony, France |
| [21] | Appl. No. | 824,241 |
| [22] | Filed | May 13, 1969 |
| [45] | Patented | June 1, 1971 |
| [73] | Assignee | Societe Anonyme Francaise Du Ferodo |
| | | Paris, France |
| [32] | Priority | May 20, 1968 |
| [33] | | France |
| [31] | | 152,439 |

[54] STATIONARY TEST STANDS FOR VEHICLES
18 Claims, 12 Drawing Figs.
[52] U.S. Cl.................................................... 73/117, 73/133
[51] Int. Cl. .................................................. G01m 17/00
[50] Field of Search............................................. 73/117, 117.4, 141, 71.7

[56] References Cited
UNITED STATES PATENTS
| 3,190,108 | 6/1965 | Ormond ...................... | 73/117.4UX |
| 3,449,947 | 6/1969 | Ormond ...................... | 73/141X |

*Primary Examiner*—Jerry W. Myracle
*Attorney*—Young and Thompson

ABSTRACT: The invention specifically relates to a base frame assembly for test purposes, in which a roller used in the stationary testing of a self-propelled vehicle may be fitted. This test base-frame includes a stationary reference frame, and a floating frame for carrying a roller and is installed on the reference frame by means of devices allowing it to perform small displacements along three orthogonal axes with respect to the reference frame, strain gauges being situated between the said frames. The invention enables a rolling track to be provided for the stationary testing of a self-propelled vehicle, including four test base-frames each carrying one roller.

INVENTOR
JEAN ODIER
By Young & Thompson
ATTYS.

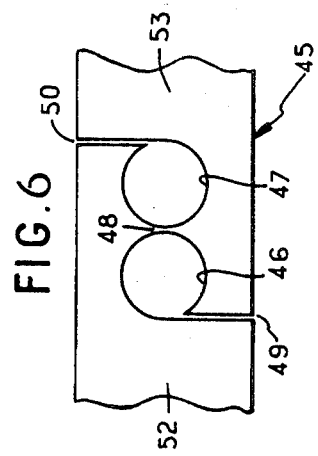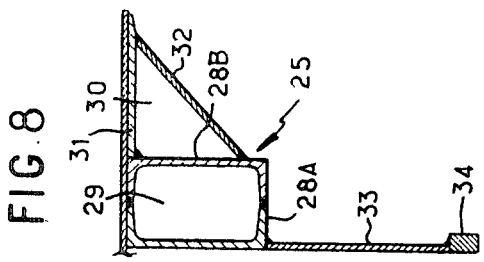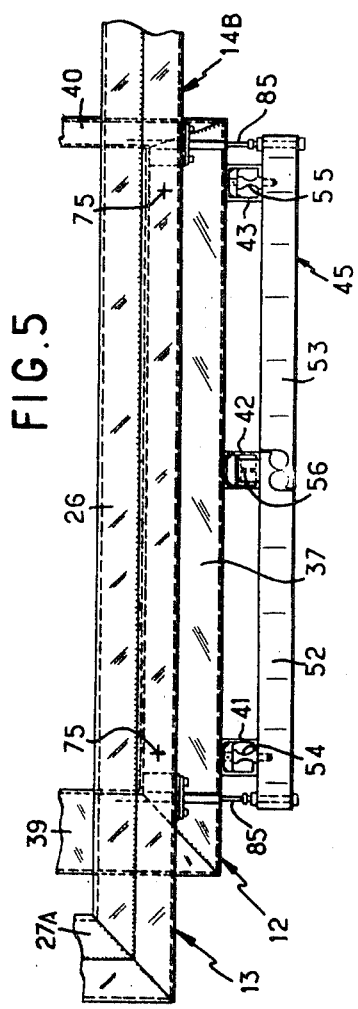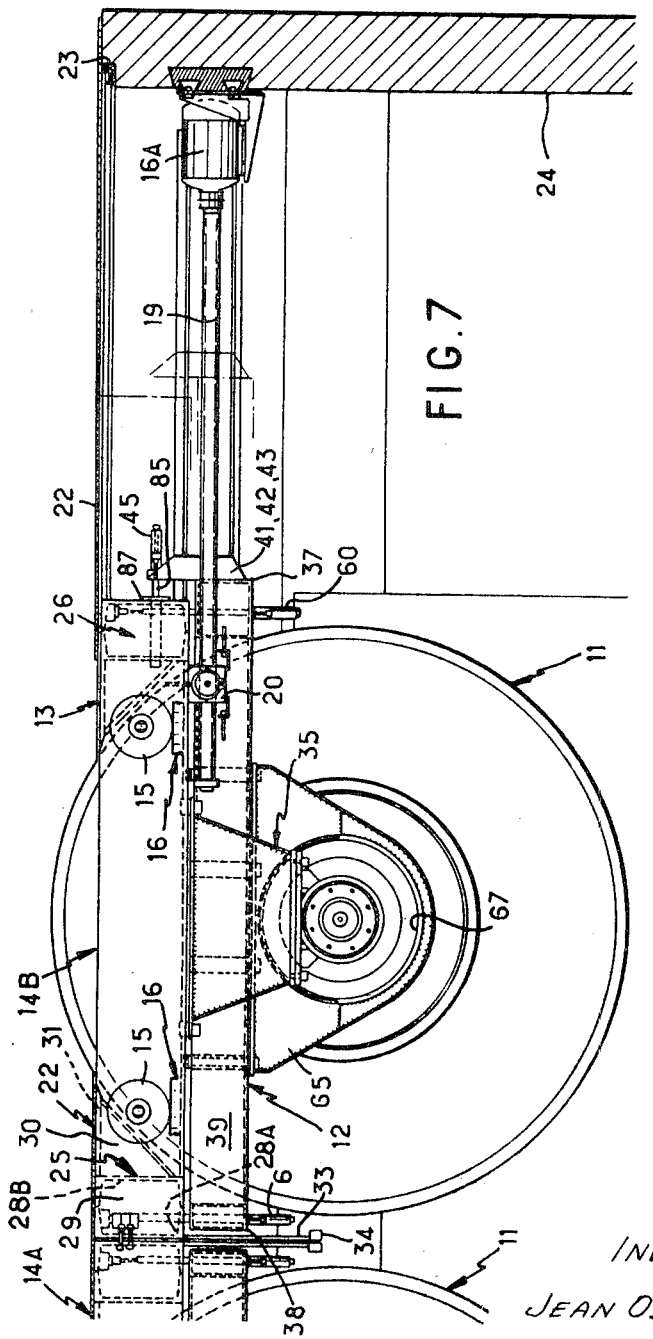

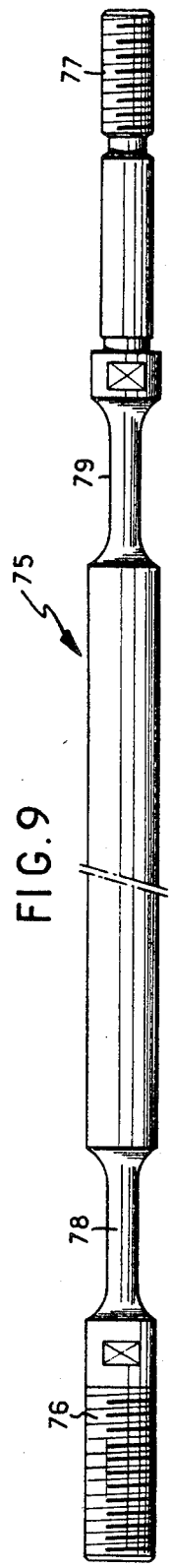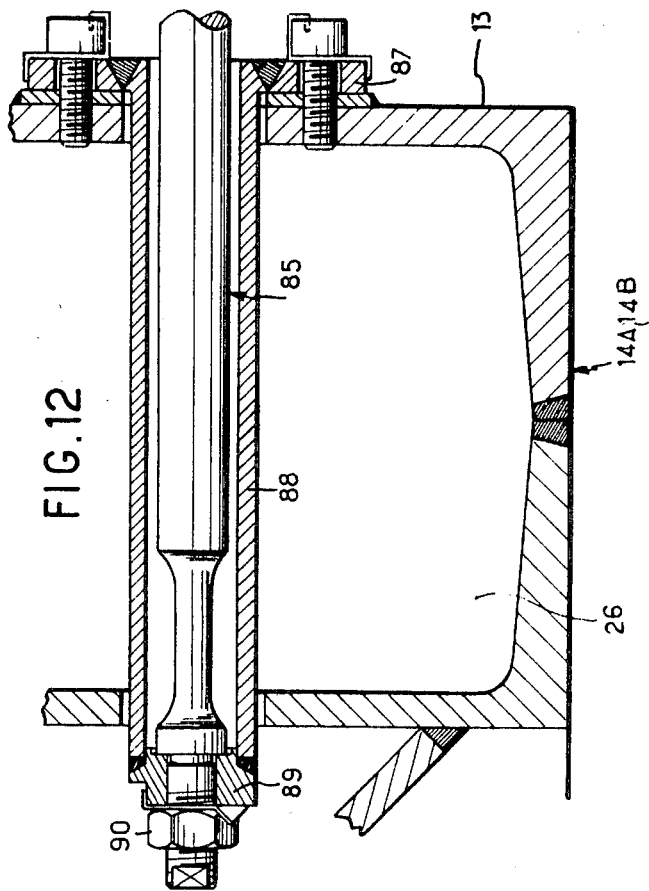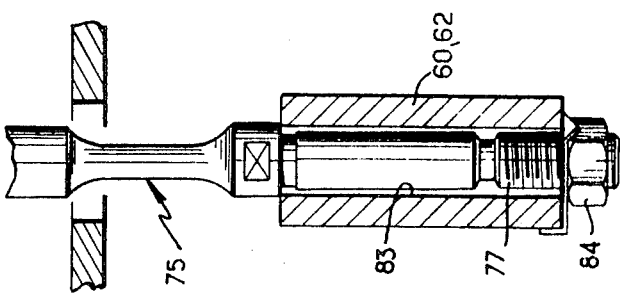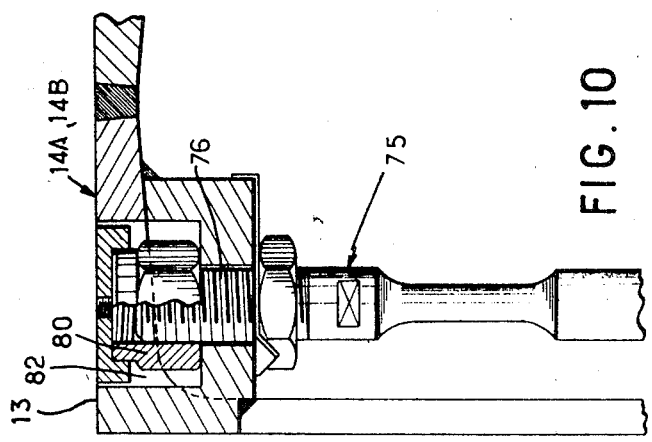

STATIONARY TEST STANDS FOR VEHICLES

BACKGROUND OF THE INVENTION

The present invention relates to a base-frame assembly for a stationary test stand for a vehicle and to such a frame having rollers whereby it is possible to provide a rolling track and to perform braking tests while a vehicle is stationary.

Stationary test stands for vehicles occasionally include a rolling track formed by four separate rollers, each being intended to support one of the wheels of the vehicle under test.

It is essential, for example in the case of braking tests, that the forces exerted by each of the wheels on the roller which supports it, and the torques applied or transmitted, can be measured.

For this purpose, it has already been proposed that the bearings of each roller in a stand be suspended from dynamometric blades operating by flexing, the blades bearing electrical strain gauges which make possible the determination of changes by flexing.

In practice, an arrangement of this nature is not entirely satisfactory, since the measurements made are necessarily affected by the deformation thus imposed on the dynamometric bearing blades or straps, and since it is difficult to effect a precise determination of the distortion thus included in the measurements.

The present invention provides an arrangement which is less likely to suffer from these disadvantages.

SUMMARY

According to one aspect of the present invention, there is provided a base-frame assembly for a stationary test stand for vehicles having a reference frame, a floating frame, arranged to carry a roller and having three degrees of freedom for small displacements, relative to the reference frame along three orthogonal axes and means for measuring the forces on elements between the same frames.

According to another aspect of the invention, such a base-frame is provided with rollers to form a stationary test bed for a vehicle. No element operating by flexing is incorporated in these arrangements.

The term "floating frame" where used in this specification and claims refers to a frame which has freedom for small displacements along three orthogonal axes relative to the reference frame.

In a preferred embodiment of the invention, the floating frame is suspended from the reference frame by means of four vertical tie rods coordinated in pairs, the two tie rods of one pair being secured on the one hand to the reference frame and on the other hand to the extremities of a vertical dynamometric balance formed by two levers or beams which are each journaled on the floating frame around horizontal spindles and are hingedly joined together abreast of a joint shared with the said floating frame, the said shared joint carrying a strain gauge. This shared joint or linkage intrinsically assures the mechanical summation of the vertical forces applied to the dynamometric balance in question, and it is the resultant of these forces along, which is thus measured.

The floating frame is preferably connected to the reference frame by at least two horizontal tie rods, the said tie rods being linked on the one hand to the reference frame and on the other hand to a horizontal dynamometric balance, of the same type as that referred to above.

The floating frame is also connected to the reference frame by means of at least one linkage parallel to the axis of the roller it bears, the linkage carrying a strain gauge.

These arrangements render it possible to determine the forces applied to a roller by the wheel it bears, along three orthogonal axes, and result in a very rigid overall structure tending but a little to undergo deformations of such a nature as to affect the measurements.

For this purpose, and in order to establish satisfactory rigidity, the reference frame includes two longitudinal members parallel to the generatrixes of the rollers, at least one of the said longitudinal members being formed by a beam of rectangular box section on which is secured, along its edge farthest from the corresponding roller, a vertical flange whose freestanding edge carries a stiffening bar parallel to the axis of the roller; moreover, there is preferably secured, on the side of the box-section beam which is closest to the corresponding roller, another triangular section beam formed by an upper horizontal flat element, and a lower oblique flat element.

In another arrangement, the reference frame passes around the corresponding roller along a median plane parallel to the axis of the roller, close to the upper horizontal generatrix of the roller.

The measurements are thus made at a level close to that at which the corresponding forces are engendered, this arrangement is advantageously of such nature as to minimize still further the contingent inherent influence of both the reference frame and the floating frame on the said measurements.

In a particular arrangement of the base frame assembled with rollers to provide a test stand, the rollers are coupled in rotation by a shared transmission system; for this purpose each roller has a hub at each of its lateral extremities by means of which it may be coupled to a shaft forming a part of the transmission system, the bore of the hub having four longitudinal grooves uniformly spaced apart peripherally, and the shaft carrying four rotary rollers abreast of the hub, each roller being engaged in a corresponding one of the grooves.

As a result of this arrangement, the shaft can make small displacements with respect to the roller, for example an axial slip, or a tilt, without these relative displacements implying any slipping; they all occur under rolling motion and, accordingly, are not of such nature as to transmit to the rollers any interference forces likely to affect this measurements.

This shaft may moreover carry a torsion meter rendering it possible to determine the torque applied to it.

A dynamometric balance is also provided for use in a base-frame and/or in a stationary test stand for vehicles. In a very generalized manner, this balance consists of a rule or bar which is articulated at its extremities and has an area of reduced cross section at its middle portion.

This arrangement offers the advantage of mechanically assuring the summation of the forces applied to the rule or bar, the resultant of these forces necessarily passing through the area of reduced cross section, abreast of which it can be measured, for example by means of a strain gauge.

BRIEF DESCRIPTION OF THE DRAWINGS

An embodiment of the invention will now be described with reference to the accompanying drawings, in which:

FIG. 5 is a partial plan view showing a detail of FIG. 1 on a larger scale, FIG. 6 is a view on a larger scale of a detail of FIG. 5 relating to a dynamometric balance, FIG. 7 is a partial view in elevation and in section along the line VII—VII of FIG. 1, of the test stand, FIG. 8 is a view in section along the line VIII—VIII of FIG. 1, of the sole reference frame of one of these rollers, FIG. 9 is a plan view of one of the vertical tie rods employed in the test stand, FIG. 10 illustrates the arrangement of this tie rods on one of the two frames to which it is linked, FIG. 11 illustrates the arrangement of this tie rod on the other of these frames, and FIG. 12 illustrates the arrangement of a horizontal tie rod on one of the two frames to which it is linked.

DESCRIPTION OF THE PREFERRED EMBODIMENT

Figure 1:
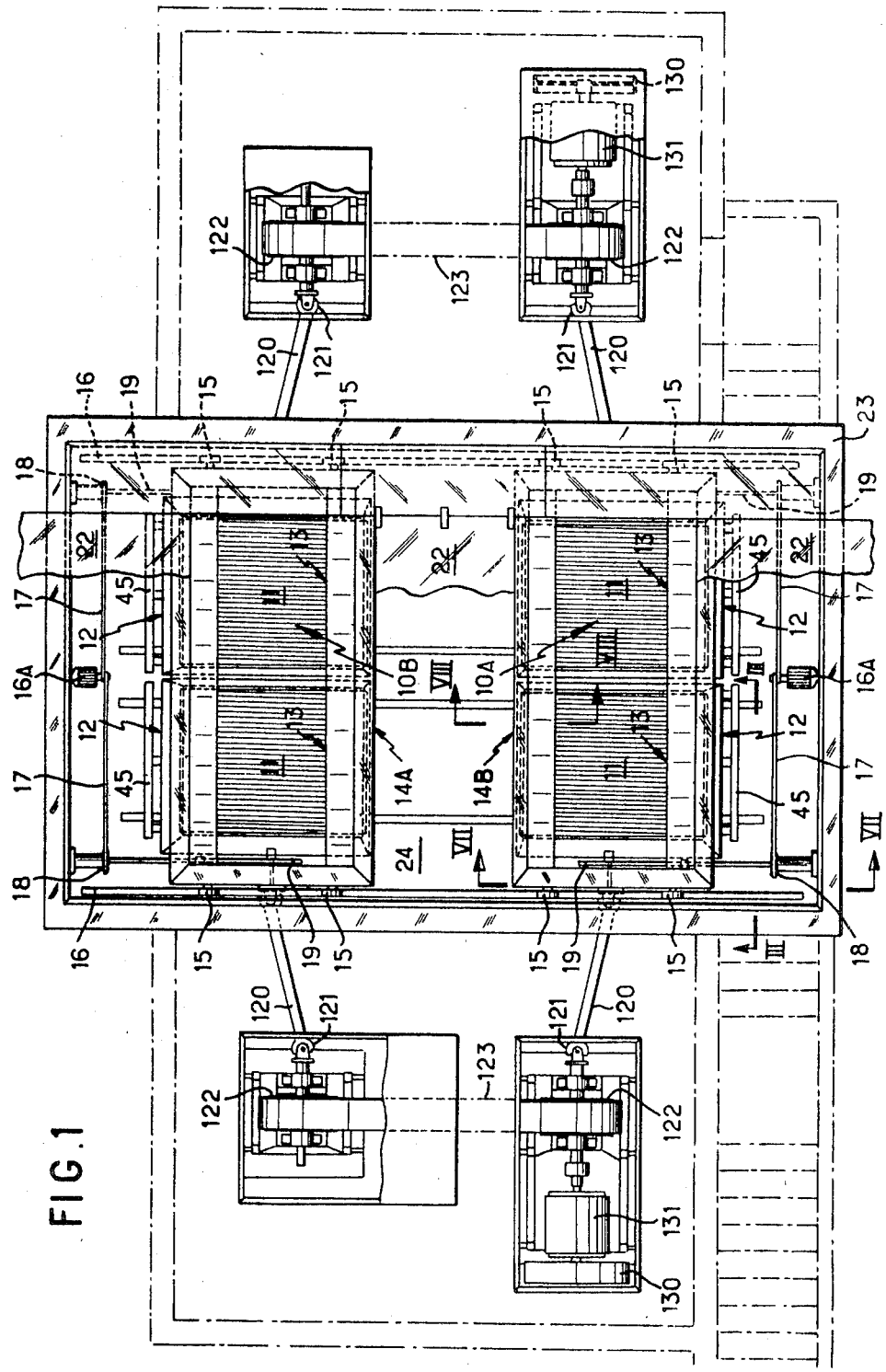
FIG. 1 is a plan view, with portions cut away, of a test stand for vehicles.

Referring to the drawings, there is shown a stationary test stand for vehicles, which, as may be seen from FIG. 1, includes two rolling sets 10A,10B each comprising two rollers 11. Each roller 11 is rotatably arranged, as described below, in a separate frame 12. This frame 12 is itself floatingly arranged relative to a reference frame 13, the reference frames 13 of the two rollers 11 of one and the same rolling set 10A,10B forming a common cradle 14A,14B, respectively.

The cradles 14A,14B carry rollers or wheels 15 laterally, and can thus roll on rails 16, each actuated by a motor 16A acting in a coupled manner by means of belts stand and pulleys 18, on screw-threaded rods 19 engaged in nuts 20 (see FIGS. 3 and 7) carried by the cradles.

By displacement of the cradles 14A,14B, it is possible to adapt the interaxial distance of the rollers 11 to the wheelbase of the vehicle tested, each of the rollers 11 of this stand being intended to carry one of the wheels of the said vehicle.

Figure 3:
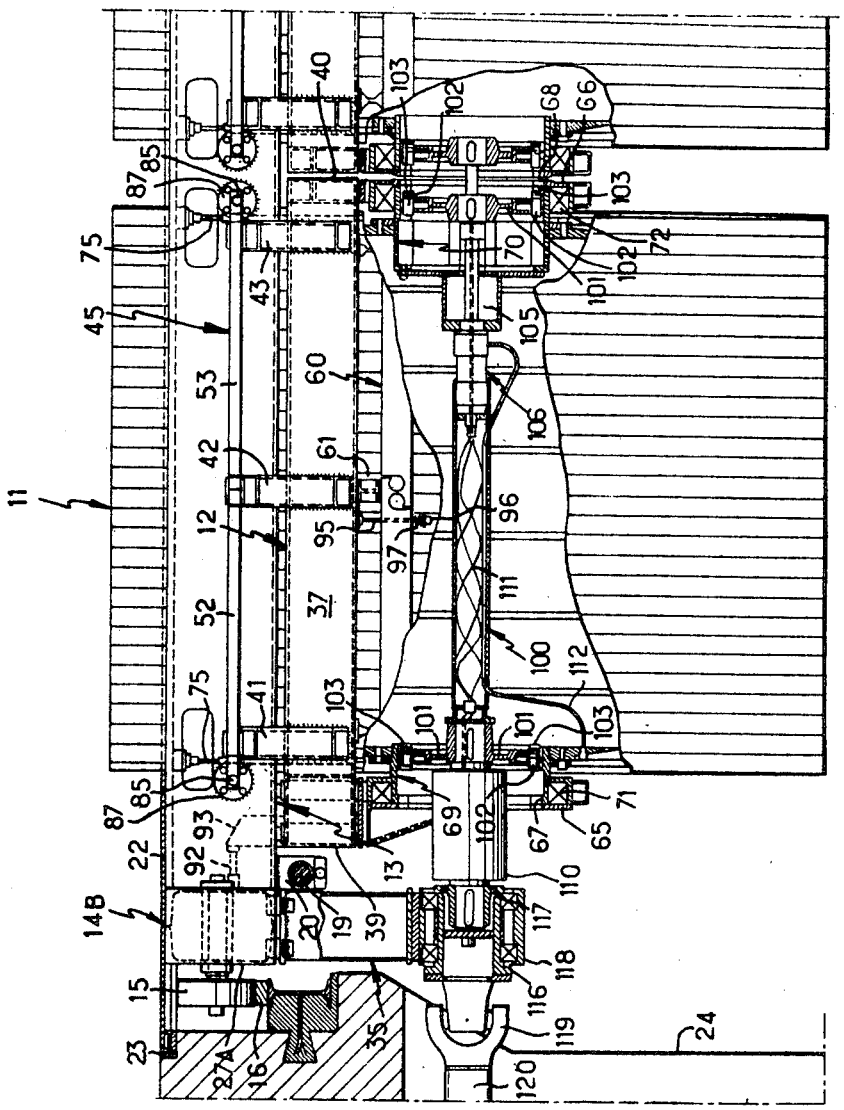
FIG. 3 is an enlarged scale partial view in section along the line III—III of FIG. 1, with a cut away portion which in axial section shows a part of one of the rollers of the stand and associated elements.

The rollers 11 project slightly above the upper level of the cradles 14A,14B and removable panels 22 are arranged between these to form a floor, this floor bearing laterally against a frame 23 reinforcing the periphery of a pit 24 within which is situated the stand according to the invention (see FIGS. 3 and 7). In FIG. 1 the two sets of rollers are shown at the maximum distance from one another and in FIG. 7 they are shown at the minimum distance.

Each cradle 14A,14B consists of two longitudinal members 25,26 and three crossmembers 27A, 27B, 27C. As may be seen from FIGS. 7 and 8, the longitudinal member 25 closest to the transverse symmetry plane of the stand includes two U or channel sections 28A,28B having their flanges combined to form a first box section beam 29; with this beam 29 there is combined, on its side closest to the corresponding rollers 11, a second boxed beam 30 of triangular section formed by an upper flat horizontal portion 31 and an oblique lower flat portion 32; the box section beam 29 carries, on its lower surface, along its edge most distant from the beam 30, a vertical flange 33 whose freestanding edge has a stiffening bar 34.

This assembly, formed by welding, imparts a high moment of inertia to the cross section of a longitudinal member 25 and thus contributes to establishing a high degree of rigidity to the member. Moreover, this assembly provides an optimum use of the volume available on either side of a roller 11, as may be seen from FIG. 7.

An analogous arrangement is adopted for the other longitudinal member 26, which, however, lacks a vertical flange for reasons which will become apparent in the following.

Each cradle 14A,14B has two flanges 35 (FIGS 2, 3 and 7) arranged for fitting in position, bearings assuring local support for a transmission line to be described below.

Figure 2:
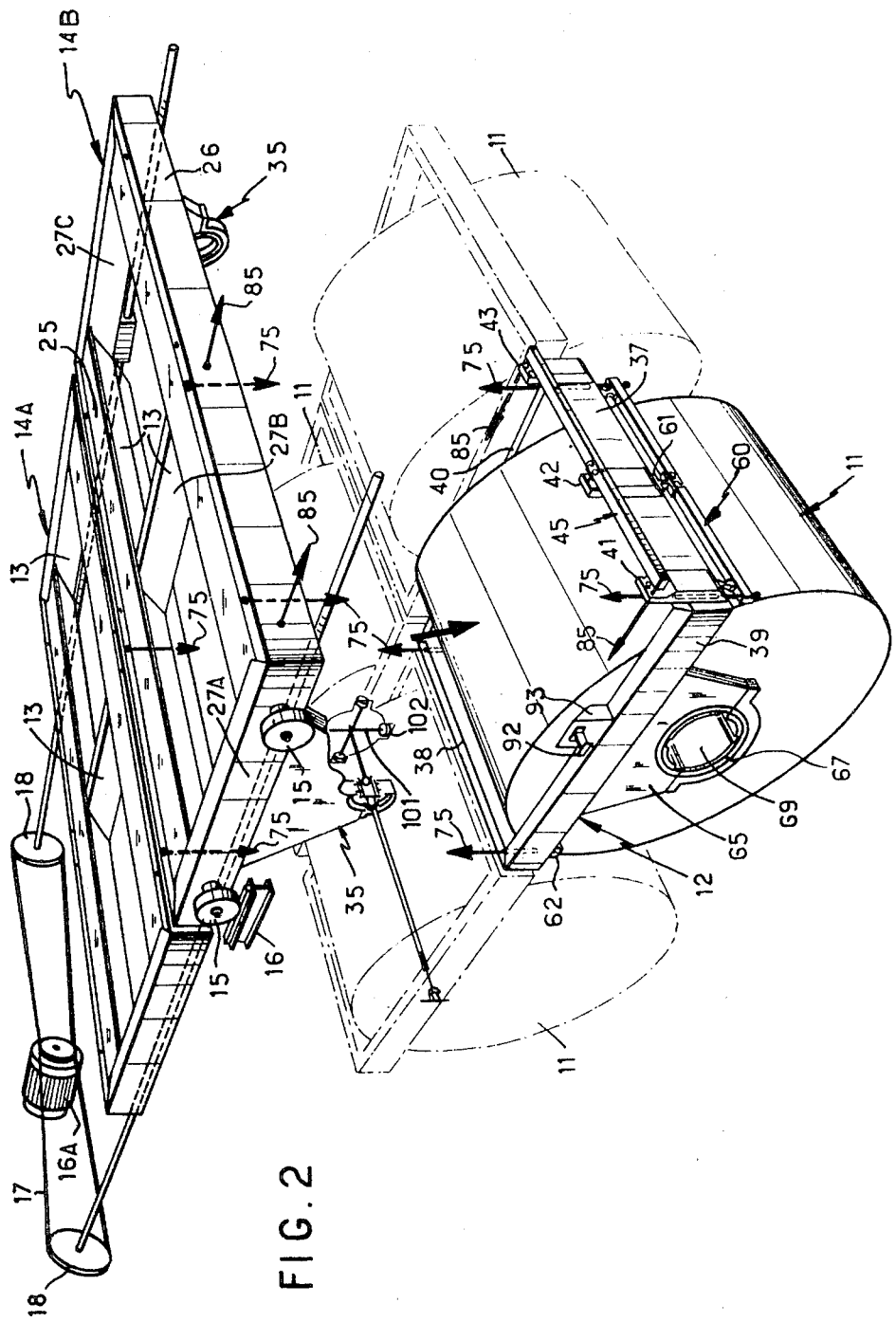
FIG. 2 is an exploded diagrammatical view in perspective, of the principal elements of this stand.

Each floating frame 12 has two longitudinal members 37,38 and two crossmembers 39,40 as may be seen from FIG. 2, the longitudinal member 37 most distant from the transverse symmetry plane of the stand has on its front face three lugs 41,42,43 which are uniformly spaced apart. The extremities of a dynamometric balance 45 are articulated (see FIGS. 2, 5, 6 and 7) on end lugs 41,43.

The dynamometric balance, which may form an independent feature, includes a bar having a characteristic middle portion illustrated separately and on a large scale in FIG. 6. In this middle portion there are two cavities 46,47 which are separated from each other only by an intermediate partition 48 of small thickness. Moreover, each cavity 46, 47 opens to the outside on opposite sides of the bar, in a slot 49,50 respectively, which in the embodiment shown, is narrow and is situated as far as possible from the portion 48 of small thickness.

It will be understood that this bar or balance 45 is equivalent to two levers or beams 52,53 linked end to end by a shared articulation formed by the portion 48 of small thickness. Each lever 52,53 of this balance is also articulated on the corresponding lug 41,43 of the frame 12 by means of a section 54,55 respectively, having a core of reduced thickness; sections of this kind form articulations having vertical hinge pins or shafts around which the levers 52,53 can make very small horizontal pivoting displacements. The balance 45 will, accordingly, be referred to hereinafter as the horizontal balance.

As may be seen from FIGS. 2 and 5, the portion 48 of small thickness of this balance is connected to the central lug 42 which carries the frame 12 by means of a section 56 bearing an electrical strain gauge. This section 56 forms a linkage interposed between the levers 52,53 and the floating frame 12 common to these two levers.

Moreover, the longitudinal member 37 of a floating frame 12 carries on its lower face a dynamometric balance 60 of similar structure to that of the balance 45, but having component levers which may undergo vertical pivoting displacements (see FIGS. 2, 3 and 7); the portion of this balance of reduced thickness is connected to the longitudinal member 37 by means of a section 61 bearing an electrical strain gauge.

Similarly, the longitudinal member 38 of a floating frame 12 carries on its underside a vertical dynamometric balance 62 (see FIGS. 2 and 7) having the portion of reduced thickness connected, as previously, to the longitudinal member by means of a section carrying an electrical strain gauge (not visible in the FIGS.).

The crossmembers 39,40 of the floating frame 12 each have a flange 65,66, respectively, with an opening 67,68 respectively, which acts as a bearing for one of the hubs 69,70 of the corresponding roller 11, with interposition of a respective ball bearing 71,72.

Each floating frame 12 is suspended from the corresponding cradle 14A,14B, that is to say from its corresponding reference frame 13, by means of four vertical tie rods 75 situated at the corners of the floating frame. These tie rods have been shown by simple arrows in FIG. 2, for one only of the frames 12, and by simple crosses in FIG. 5.

One of these tie rods 75 is illustrated separately in FIG. 9 from which it can be seen that it consists of a simple cylindrical rod whose extremities 76,77 are screw-threaded. This rod moreover has two portions 78,79 of reduced cross section, whose function will be described below.

Each tie rod 75 has one of its extremities yoked to the corresponding cradle 14A,14B. As shown in an arrangement illustrated in detail in FIG. 10, a nut 80 which bears against the bottom of a recess 82 in the cradle, is screwed on the upper screw-threaded extremity 76 of the tie rod 75.

At its other extremity, this tie rod is yoked to the corresponding vertical dynamometric balance 60,62, (see FIG. 11). Its lower screw-threaded extremity 77 passes through a passage 83 in the balance and beyond the balance to aunt 84 forming a support.

The floating frame 12 is also connected to its reference frame by means of two horizontal tie rods 85. These tie rods, which are indicated by simple arrows in FIG. 2, are of similar form to the vertical tie rods 75. On the one hand, they are yoked to the reference frame in question, and on the other hand to the horizontal dynamometric balance 45. The fitting of the rods on the reference frame 13 is illustrated in detail in FIG. 12, in which the front longitudinal member of the corresponding cradle 14A,14B is shown at 26. On the front face of this longitudinal member there is secured a plate 87 firmly joined to a tube 88 which traverses the said longitudinal member. This tube is closed off by a plug 89 through which one of the screw-threaded extremities of the tie rod 85, cooperating with a nut 90, passes.

Apart from the tie rods 75, and 85, a floating frame 12 is also connected to the corresponding reference frame 13 or to the corresponding cradle 14A,14B, by means of a connection or link parallel to the axis of the corresponding roller 11. This link, shown only in FIGS. 2 and 3, is provided by a section 92 interposed between, on the one hand, a lug 93 carried by the crossmember 39 of the frame 12, being the most distant from the longitudinal symmetry plane of the stand, and on the other hand the corresponding crossmember 27A of the cradle 14A,14B in question. The section 92 carries an electrical strain gauge.

Each floating frame 12 is thus connected to its reference frame 13 by mans of an assembly which is sufficiently rigid for its own deformations not to affect the measurements.

These measurements may be made as follows:

The resultant of the vertical forces to which the two corresponding vertical tie rods 75 are exposed is measured by means of the dynamometric balance 60 and the strain gauge coordinated with it. The strain gauge is carried by the section 61 which forms a shared connection between the two levers of the balance and the frame 12, abreast of the portion of the balance of lesser thickness.

The resultant of the vertical forces to which the two other vertical tie rods 75 are exposed is determined by the dynamometric balance 62.

From the values thus obtained, the vertical component of the force F exerted on the roller 11 is question by the wheel it carries is determined by a summation which may be made electrically.

Similarly the dynamometric balance 45 makes possible the determination of the horizontal component of this force F along a direction at right angles to the axis of the roller.

The component of the force F along a direction parallel to the axis of the roller may be determined by the strain gauge carried by the section 92.

The force F is this determined by three components acting in orthogonal directions.

As will have been understood, the portions of the tie rods 75 and 85 of lesser thickness give them a definite degree of transverse flexibility, which is clearly of very restricted amplitude; these portions of lesser cross section may also be used for implanting electrical strain gauges which make possible the determination of the moment to which each tie rod is contingently exposed.

It will be noted moreover that the reference frame 13, or the corresponding cradle 14A,14B of each roller, is situated close to the top generatrix of the roller in the arrangement described. The plane in which the measurements are made is thus very close to the plane in which the corresponding force is applied, which advantageously minimizes the possible influence of the frames 12 and 13 on these measurements.

In the absence of a vehicle on the stand, it is advantageous for the force "weighed" by the vertical balances 60 and 62, that is to say the force corresponding solely to the weight of the roller 11, of the floating frame 12 and of the different elements linking them, to be equal to zero.

For a calibration of this nature, and as illustrated diagrammatically in FIG. 3 in respect of the balance 60 only, each balance 60,62 is coordinated with an additionally vertical tie rod 95. This tie rod has its upper extremity secured to the corresponding longitudinal member 37,38 of the frame 12. At its lower extremity, it traverses the balance 60,62 for cooperation with a nut 96 with the interposition of a spring 97 between the nut and the balance. By screwing this nut a varying amount, the reading of the measurement indicated by the gauge coordinated with the balance in question may be set to zero.

The transmission line interconnecting the different rollers 11 will now be described.

As may be seen from FIG. 3, each roller 11 is coordinated with a shaft 100.

In alignment with the outermost hub 69 of the roller 11, the shaft 100 carries four orthogonal arms or spokes 101 in pairs. Each spoke carries a bearing roller 102 and this bearing roller is engaged in a groove 103 formed in the hub 69 parallel to the axis of the hub.

Figure 4:
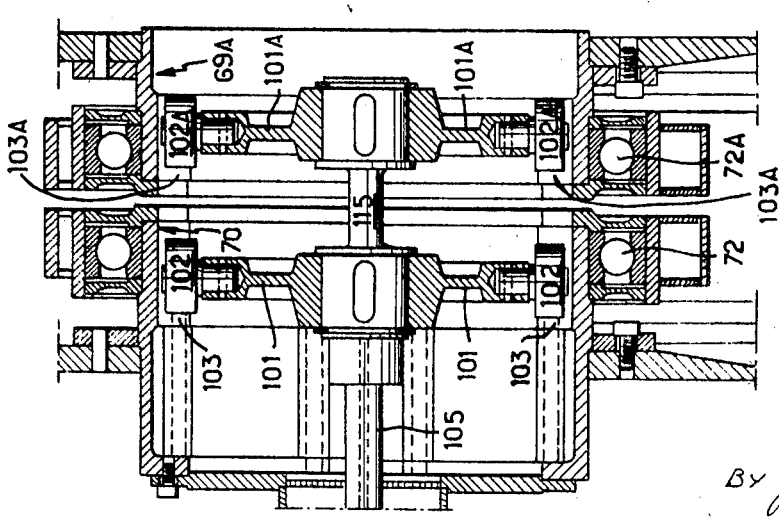
FIG. 4 is a view illustrating a detail of FIG. 3 on a larger scale.

A similar arrangement is shown in FIGS. 3 and 4 in alignment with the innermost hub 70 of the roller 11, which hub equally has four axial grooves 103. However, the corresponding spokes 101 are not carried directly by the shaft 100; they are carried by a shaft 105 rotatably keyed together on the shaft 100, but slidingly arranged on latter shaft under the control of a cylinder-piston assembly 106 not shown in detail (FIG. 3).

Thanks to this bearing roller arrangement, the shaft 100 may equally be displaced angularly or a axially relative to the roller, without transferring to the roller any forces liable to falsify the measurements; in point of fact these displacements result in rolling motions only, without slip.

Externally, at the side of the hub 69, the shaft 100 has an extension 110 on which is secured a torsion meter which renders it possible to determine the torque transmitted by this shaft; a second torsion meter may be carried by the shaft 100 close to the hub 70 to determine the torque applied to this shaft by the other roller of the set of rollers in question.

The shaft 100 is hollow, for traversal by electrical conductors 111 corresponding to this second torsion meter, as well as for traversal by a hydraulic hose 112 feeding the cylinder-piston assembly 106.

Beyond the hub 70, see fIG. 4, the shaft 105 is extended by a shaft 115; this shaft 115 carries four arms or spokes 101A, equipped with bearing rollers 102A engaged in grooves 103A cut axially into the hub 69A of the adjacent roller 11.

The control exerted by the cylinder-piston assembly 106 renders it possible to withdraw these spokes 101A within the hub 70 of the roller in question when installing or dismantling the rollers.

The external extension 110 of the shaft 100 is linked to a hub 116, preferably by means of a revolving abutment 117. This hub is rotatably arranged in a bearing 118 carried by the crossmember 27A of the corresponding cradle 14A,14B.

The hub 116 is coupled to a shaft 120 by a universal joint, 119.

Reference will now be made to FIG. 1.

The shaft 120 is coupled in rotation by means of a universal joint 121 to a pulley 122 which is connected by a belt 123 to the pulley 122 coordinated in a similar manner to the corresponding roller 11 of the other set of rollers.

Two pulleys 122 are thus coordinated with the set of rollers 10A on either side of the rollers 10A; similar arrangement is adopted for the set of rollers 10B.

The four rollers 11 are thus interconnected in rotation.

Each of the pulleys 122 of the set of rollers 10A is coordinated with an additional inertial flywheel 130 whose eventual intervention may occur through a gearbox 131.

This arrangement renders possible the adaptation of the stand to heavier vehicles.

The present invention is not limited to the form of embodiment described and illustrated, but encompasses all variants within the scope of the appended claims.

We claim:

1. A base-frame assembly for a stationary test stand for vehicles, comprising a reference frame, a floating frame carrying a roller for supporting a vehicle wheel and having three degrees of freedom for small displacements relative to the reference frame along three orthogonal axes, and means for measuring the forces between the said frames.

2. A base-frame assembly as claimed in claim 1, having a plurality of tie rods by means of which the floating frame is suspended from the reference frame.

3. A base-frame assembly as claimed in claim 2, including four vertical tie rods arranged in pairs, by means of which the floating frame is suspended from the reference frame by horizontal shafts on the floating frame, a vertical dynamometric balance having two levers which are each articulated on the floating frame around the horizontal shafts, and a connection carrying a strain gauge to which the levers are hingedly interconnected to provide a shared connection to the floating frame, the two tie rods of one pair being secured on the one hand to the reference frame and on the other hand to the vertical dynamometric balance.

4. A base-frame assembly as claimed in claim 3, wherein the two levers of the dynamometric balance form a single unit which, in its middle part, has a portion of lesser cross section forming their shared articulation.

5. A base-frame assembly as claimed in claim 3, including a calibrating tie rod by means of which each of the levers of the dynamometric balance is connected to the reference frame, the calibrating tie rod traversing and extending beyond the lever, a support element situated on the extending portion of the tie rod whose position is adjustable along the tie rod, resilient means interposed between the lever and the support element.

6. A base-frame assembly as claimed in claim 3, including at least two horizontal tie rods by means of which the floating frame is connected to the reference frame, the two horizontal tie rods being yoked to the reference frame, a horizontal dynamometric balance to which the horizontal tie rods are also yoked, the horizontal balance being similar to that to which the vertical tie rods are connected.

7. A base-frame assembly as claimed in claim 3, wherein the tie rods have at least one portion of lesser cross secton giving them transverse flexibility.

8 A base-frame assembly as claimed in claim 3, including a connection parallel to the coordinated roller by means of which the floating frame is also connected to the reference frame, the said connection carrying a strain gauge.

9. A base-frame assembly as claimed in claim 1, in which the reference frame is arranged to pass around the roller along a median plane parallel to the axis of the said roller, close to the top horizontal generatrix of the rollers.

10. A base-frame assembly as claimed in claim 1, including two longitudinal members parallel to the generatrixes of the roller and forming a part of the reference frame, at least one of the said longitudinal members being formed by a box section beam of rectangular cross section, a vertical flange having a freestanding edge on the lower face of the box section beam, secured along the edge of the beam most distant from the corresponding roller, and a stiffening bar, parallel to the axis of the roller, carried on the freestanding edge of the vertical flange.

11. A base-frame assembly as claimed in claim 10, including a further box section beam of triangular cross section formed by a flat upper horizontal element and by a flat lower oblique element secured on the side of the first mentioned box-section beam closest to the corresponding roller.

12. A base-frame assembly claimed in claim 1, including four rollers carried by the base-frame, whereby a rolling track for a stationary test stand for vehicles is formed.

13. A base-frame assembly as claimed in claim 12, wherein the reference frames of two rollers having axes situated on an extension of the other form a unit, rails for supporting this unit, and means to mount this unit movably on said rails.

14. A base-frame assembly as claimed in claim 12, including a transmission system shared by and coupling the rollers.

15. A base-frame assembly as claimed in claim 14, including a hub at the lateral extremity of each roller, a shaft forming a part of the said transmission system which may be coupled for rotation with a hub, four longitudinal grooves uniformly distributed peripherally around the bore of the hub, four rotatably bearing rollers each engaged in one of the said grooves and carried on the shaft in alignment with the hub.

16. A base-frame assembly as claimed in claim 15, including torsion meters carried on the shaft.

17. A base-frame assembly as claimed in claim 15, including a universal joint by means of which the shaft is connected to the rest of the transmission system.

18. A base-frame assembly as claimed in claim 15, including in the transmission system inertial flywheels and gear boxes by means of which the flywheels may be brought into operation.